United States Patent [19]
Waki et al.

[11] 3,792,571
[45] Feb. 19, 1974

[54] METHOD AND APPARATUS FOR PURIFYING WASTE GAS

[75] Inventors: Koichi Waki, Setagaya-ku; Tadashi Suzuki, Tokyo; Toshinobu Mitsui, Yokohama, all of Japan

[73] Assignee: Showa Denko Kabushiki Kaisha, Tokyo, Japan

[22] Filed: Apr. 2, 1971

[21] Appl. No.: 130,726

[52] U.S. Cl............ 55/74, 55/71, 55/73, 55/97, 55/228, 55/229, 55/233, 55/240, 55/242, 55/273, 55/467, 55/485, 261/100, 423/230, 423/234, 423/241, 423/244
[51] Int. Cl............................. B01d 53/04
[58] Field of Search..... 55/233, 227, 228, 229, 242, 55/243, 90, 74, 71, 73, 97, 240, 273, 467, 485; 261/94, 97, 112, 100; 423/230, 234, 241, 244

[56] References Cited
UNITED STATES PATENTS

| | | |
|---|---|---|
| 1,715,252 | 5/1929 | Sperr, Jr. .......................... 261/94 X |
| 1,842,316 | 1/1932 | Coulter ............................. 55/243 X |
| 2,165,490 | 7/1939 | Kranz ................................ 55/90 X |
| 3,105,749 | 10/1963 | Gebert et al. ..................... 261/97 X |
| 3,210,914 | 10/1965 | Ekert ................................ 55/90 |
| 3,318,075 | 5/1967 | Wilson ............................. 55/228 |
| 3,353,799 | 11/1967 | Lions et al. ..................... 261/112 X |
| 3,485,015 | 12/1969 | Vecchio .......................... 55/274 X |
| 1,941,524 | 1/1934 | Wittemeier et al. ............. 55/290 X |
| 2,633,929 | 4/1953 | Farr ................................ 55/283 X |

FOREIGN PATENTS OR APPLICATIONS 5,486   1931   Australia............................. 55/242

Primary Examiner—Dennis E. Talbert, Jr.
Attorney, Agent, or Firm—Kurt Kelman

[57] ABSTRACT

Purification of a gas is accomplished by passing the gas through a packed bed having an adsorbent deposited thereon and means are provided for cleaning the bed and depositing fresh absorbent thereon.

2 Claims, 6 Drawing Figures

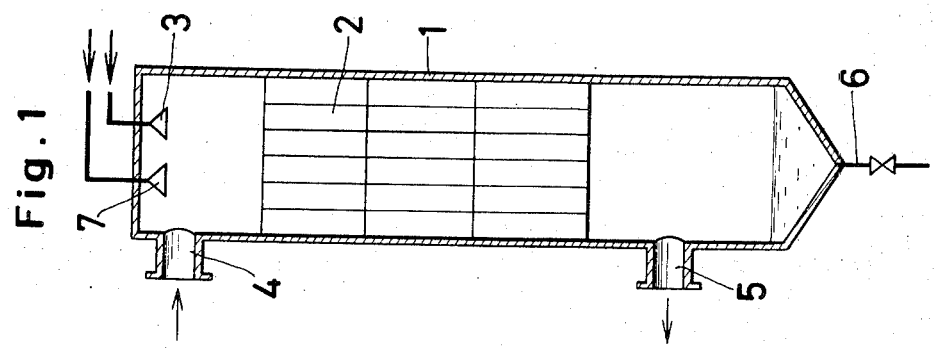
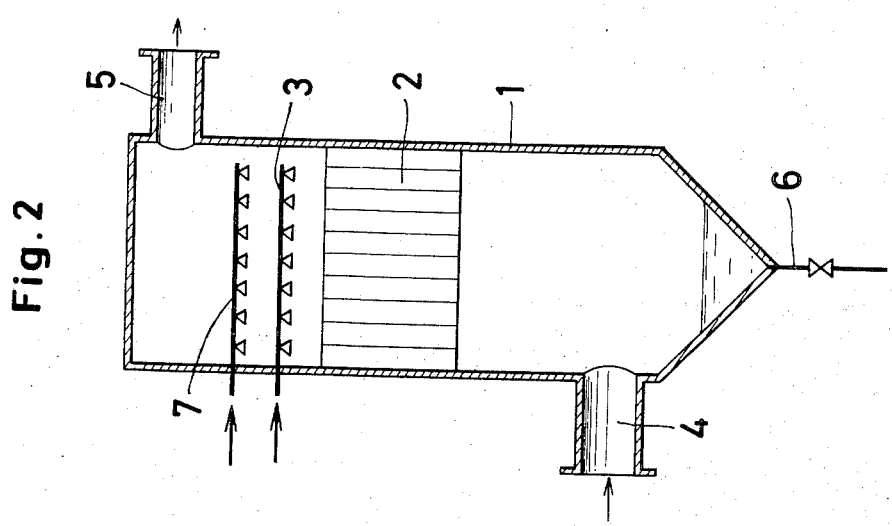
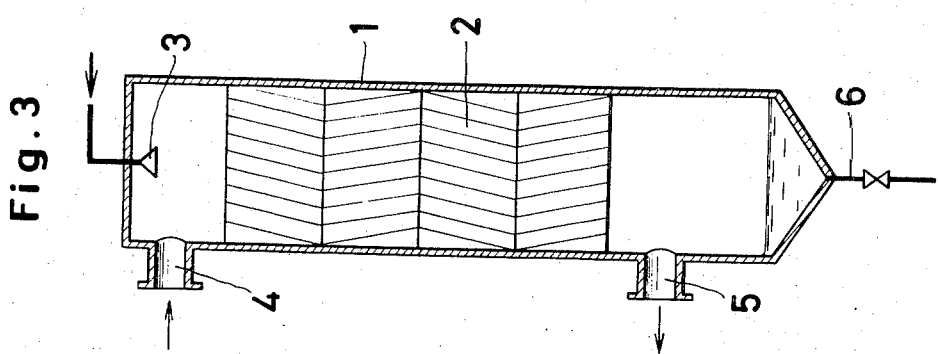

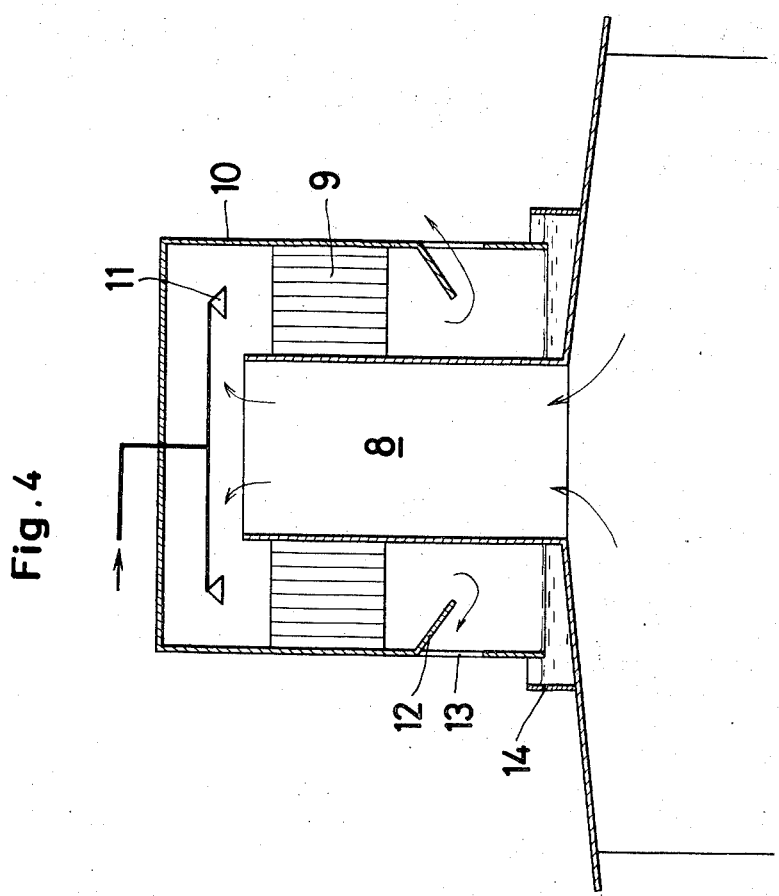

3,792,571

METHOD AND APPARATUS FOR PURIFYING WASTE GAS

This invention relates to a method and apparatus for the adsorption of noxious impurities contained in a gas.

In the aluminum manufacture plant, for example, the waste gas emanating from the electrolytic cells contains lightweight hydrocarbons, carbon oxides, sulfur compounds, fluorides, and the like produced by the chemical reaction of cryolite and the raw material within the cells. Thus, the gas heavily defiles the hygienic condition inside the building. Ventilation is requisite for maintaining the air inside a building clean at all times. On the other hand, the gas discharged directly from the plant pollutes the atmospheric air and does harm to plants growing around the plant.

Heretofore, various methods have been proposed for the treatment of gases which contain such fluroides.

These methods are represented by two methods: one method accomplishes the removal of fluorides by scrubbing the waste gas emanating from the electrolytic cells with an alkali solution and the other method removes fluroides by washing the waste gas simply with water. When such alkali solution or water is sprayed continuously at all times, the amount of water vaporized in the air is quite large. Moreover, the operation using such mehtod requires large volumes of washing water, special facilities for drainage and huge motive power for their operation.

To heighten the adsorption ratio of fluroides in washing the waste gas with alkali solution or water, the gas-liquid contact must be improved by either increasing the amount of fluid sprayed per unit volume of gas or disposing spray nozzles in a multistage arrangement. Such measures however, pose a serious problem of loss of pressur and inevitably entail a substantial increase in the cost of facilities for adsorption and of motive power for operating the facilities.

The has further been proposed a dry method which accomplishes the removal of fluorides by pulverizing lime stone or some other fluoride-adsorbing substance and causing the resultant fine particles to be suspended in the waste gas so as to have the fluorides absorbed in the particles. When a large volume of waste gas is to be treated on an industrial scale, the operation using this method incurs an increased cost of motive power due to heavy loss of pressure and requires incorporation of such device as a bag filer designed to collect solid particles. Thus, the operation suffers from defects such as higher equipment cost and complication of operational maintenance.

Another known method accomplishes the treatment of waste gas by feeding the gas into a column packed with granular sodium carbonate as an adsorbent for absorbing fluorides present in the waste. However, this method proves to be disadvantageous in that the replacement of adsorbent is troublesome and the adsorbent is liable to be clogged by the dust suspended in the waste gas. Where a large volume of waste gas is treated, therefore, this method is unsuitable.

Methods and apparatus available for the purification of waste gas have been explained with reference to the removal of fluorine compounds by way of example. In the case of waste gases containing $Cl_2$, $SO_2$, HCN and other impurities, removal of impurities has generally been accomplished by a method using a liquid absorbent or by a method using a solid, granular adsorbent either packed in a column for contact with passing waste gas or suspended directly in the waste gas.

In order to ensure improvement in adsorption efficiency, these methods necessitate a large volume of adsorbent to be sprayed or suspended and, consequently, suffer from loss of pressure and entail an increase in the cost of motive power. They further incur such disadvantages as the inevitable burden of huge equipment cost and complication of treatments.

Compared with these conventional methods, the method of the present invention enjoys markedly high operational efficiency, low equipment cost and ease of handling. Further, this method accomplishes the adsorption of impurities chiefly under a condition in which the adsorbent is dry and, therefore, the replacement of the exhausted, adsorbient is only required to be effected through intermittent spraying. In this respect, the amount of water used is extremely ssmall and the amount of water to be drained can consequently be decreased to a great extent. This is an epochal method which enables saving to be achieved, as a natural consequence, in both equipment cost and movtive power cost. It is a principal object of this invention to provide a method and apparatus for highly efficient purification of waste gas containing noxious substances.

It is another object of this invention to provide a method and apparatus for efficient removal of a large amount of fluorides from a waste gas containing noxious substances, particularly, fluorides.

It is still another object of the present invention to provide a method and apparatus for effective removal of $Cl_2$, $SO_2$, HCN and the like from a waste gas containing such noxious substances as $Cl_2$, $SO_2$, HCN and so on.

It is one other object of this invention to provide a method and apparatus which is capable of effectively treating waste gases of widely varying fluoride contents, ranging from a relatively high level of 1,000 ppm to a very low level not exceeding 10 ppm and which is particularly effective for the treatment of waste gases containing fluorides at low concentrations.

The other objects and other characteristics of the present invention will become apparent from the description to be made hereinafter with reference to the accompanying drawings.

FIG. 1 is a sectional view of the basic apparatus for working the present invention.

FIG. 2 is a sectional view illustrating another embodiment of the apparatus for working the present invention.

FIG. 3 is a sectional view illustrating a modified form of the apparatus of FIG. 1 or FIG. 2, the modification made in the shape of the packed bed.

FIG. 4 is a sectional view illustrating the manner in which the apparatus according to the present invention is operated.

Figure 5:
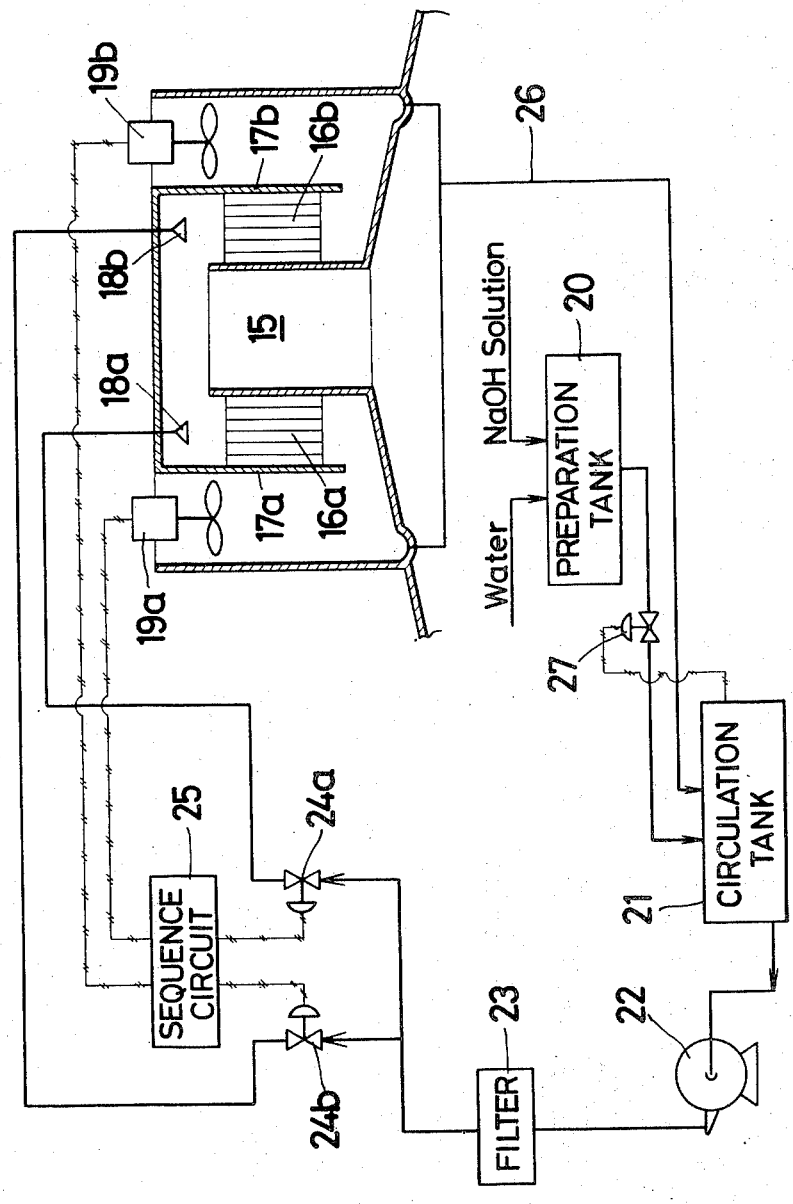
FIG. 5 is a system diagram including a sectional view of an apparatus for continuous treatment according to the present invention.

Referring to FIG. 1, a vessel 1 incorporating a waste gas feeding inlet 4 at the upper section and a purified gas discharging outlet 5 at the lower section respectively thereof with a packed bed 2 formed in the interior thereof. Said packed bed 2 is composed of latticed, ring-shaped, perforated or reticular plates of a multilayer, or matted fibrous substance arranged so as to give a large surface area per unit volume of the substance.

The packed bed is made of a material such as metal or plastic which is not corroded by the gas containing impure substances.

Above the packed bed, there are fixed a nozzle 3 for spraying an adsorbent for removing impurities from the waste gas, such as an alkali solution or alkali slurry containing sodium carbonate or sodium hydroxide and a water-spraying nozzle 7 intended for washing. When the solution of adsorbent such as sodium carbonate solution is sprayed through the nozzle 3, sodium carbonate is deposited on the surface of the packed bed 2 inside the vessel 1.

The packed bed 2 is formed with a packing material which has a high void ratio and gives a large surface area per unit volume to minimize loss of pressure. Thus, the sprayed adsorbent is deposited readily on the surface of the packed bed.

After the absorbent dissolved in a liquid has thus been sprayed on the packed bed, it may be dried by introducing the waste gas itself or, if necessary by introducing dry air through the inlet 4 prior to use for the treatment of waste gas.

Now, the treatment of a fluoride-containing waste gas emanating as from an electrolytic cell is described by way of example. The waste gas is let to the inlet 4 of the vessel 1 and forwarded to the packed bed 2. While the waste gas is passing through the said packed bed 2, fluorides present in the waste gas are adsorbed by the alkali adsorbed deposited on the packed bed 2. The fine dust contained in the waste gas is also filtered by the packed bed. Consequently, the gas which has been purified is discharged through the outlet 5.

FIG. 1 shows an apparatus which has the inlet 4 for waste gas positioned at the upper section and the outlet 5 at the lower section respectively thereof. It is, however, permissible to have the inlet 4 positioned at the lower section and the outlet 5 at the upper section as in the apparatus shown in FIG. 2.

The shape of the packed bed, the height of the packed bed determinative of the surface area exposed to contact of the waste gas, the kind of alkali solution to be used as the adsorbent, the quantity of adsorbent to be sprayed and so on are selected in accordance with the kind of gas, speed of gas flow, content of impurities and the like.

The volume of waste gas to be treated may be increased by fixing a fan, for example, at the outlet 5 thereby effecting forced suction of the waste gas.

Afer a given volume of waste gas has been treated, the adsorbent depostied on the packed bed is gradually degraded in activity.

When the accumulative total content of impurities in the effluent gas from the vessel rises to exceed a fixed level, feeding of waste gas is stopped. Then, water is sprayed onto the packed bed to wash the spent adsorbent off the bed and the washings containing the spent adsorbent are discharged via the draining pipe 6. As soon as the washing of the packed bed is completed, fresh adsorbent solution is sprayed via the nozzle 3 onto the packed bed 2.

Instead of preliminarily rinsing the packed bed with water, the alkali solution may be directly sprayed to accomplish the removal of spent adsorbent and deposition of fresh adsorbent simultaneously. Beside, the nozzle 3 for spraying the alkali solution and the nozzle 7 for spraying washing water may be combined into one nozzle for common use.

As mentioned above, this invention permits the waste gas to be purified readily, with little decline of pressure, by providing a packed bed having a high void ratio and a large surface area per unit volume and depositing an adsorbent on the surface of the said packed bed. When the adsorbent has its activity degraded, it can be replaced readily and promptly.

FIG. 3 illustrates an embodiment of the modified form of the apparatus shown in FIG. 1 or FIG. 2, with modification made in the shape of the packed bed. Reticular or perforated plates of plastic or metal are spaced regularly to form a bed and this bed is set in a zigzaggedly bent form in the longitudinal direction of the vessel 1.

Generally, the effect of adsorption rises and, at the same time, the loss of pressure increases accordingly as the number of bends contained in the packed bed increases, the angle of bend approaches the right angle with reference to the longitudinal direction and the space between plates decreases. Thus, the above-mentioned factors are suitably balanced depending on the kind of waste gas to be treated, the volume of gas and the content of impure substances.

By bending a bed of regularly spaced plates in the longitudinal direction, it is possible to provide effective collection of fine dust present in the waste gas as well as to improve the contact between the waste gas the the adsorbent. Since plates are regularly spaced, the bed will not be clogged by the fine dust contained in the waste gas and, consequently, there will be involved little loss of pressure. The washing given to remove the exhausted adsorbent and the deposition of fresh absorbent are accomplished easily by spraying the adsorbent solution onto the bed.

As mentioned above, the removal of impure substances according to this invention, is, in principle, based on the adsorption of such impure substances by the solid adsorbent. Since the adsorbent is deposited and removed in a liquid state, the device of this invention can be scaled up to large dimensions and operated continuously.

Now, a description is given of the apparatus of this invention which is mounted on the roof of a building the aluminum manufacture plant to treat the waste gas emanating from the aluminum electrolytic cell.

Referring to FIG. 4, an opening 8 for releasing the waste gas originating in the electrolytic cell is provided at the ventilator on an inclined roof. On each side of said opening 8, a plurality of vessels 10 each incorporating the packed bed 9 of the type shown in FIG. 1 or FIG. 3 are disposed continually. Above the packed beds 9, nozzles 11 designed to feed the adsorbent solution and the water for rinsing the packed bed are furnished. On the inside of the outer wall at the lower section of the vessel 10, there is provided an outlet 13 which incorporates an inwardly bent baffle plate 12. Weir 14 is laid on the roof at a fixed distance from the outer wall of the vessel.

The waste gas is led into the interior of the vessels along the courses indicated by the arrow mark. When the waste gas is brought into contact with the adsorbent deposited on the surface of the packed bed, the fluorides contained in the waste gas are adsorbed by the adsorbent. The fine dust contained in the waste gas is filtered by the packed bed 9. Only the purified effluent is discharged via the outlet 13.

When the adsorbent deposited on the packed bed has its activity degraded, the feeding of waste gas is stopped and water is sprayed onto the bed via the nozzle 11 to rinse the packed bed 9. The washings which have resulted from rinsing the packed bed are prevented by the baffle plate 12 from being scattered directly to the exterior and are collected in the duct formed by the weir 14. They flow in the duct in a fixed direction. Subsequently, the adsorbent solution is sprayed via the nozzle 11 to deposit the adsorbent on the surface of the packed bed. The waste gas is again introduced through the opening 8 to resume the adsorptive removal of impurities present in the waste gas.

In case where the treatment is given to a waste gas containing fluorides at a low concentration, the alkali solution may be used cyclically, instead of using the rinsing water, so that the fluoride content of alkali solution is gradually increased. The fluorides are recovered when the fluoride content has increased in the alkali solution. Then, the waste water containing the recovered fluorides can be treated with ease, permitting a reduction in the equipment cost and operation cost.

In actual use, a plurality of such apparatus are installed in combination. When the acitivity of the adsorbent in one group of the apparatus drops relatively low, the waste gas is fed to another group of the apparatus. During the rest period, the exhausted adsorbent is washed and a fresh supply of adsorbent is deposited in the packed bed. By putting these apparatus to use alternately, the purification of waste gas can be carried out continuously.

When these apparatus are installed in two rows on the roof of a building of an aluminum manufacture plant as illustrated in FIG. 4, for example, the packed beds for treating the waste gas can be subjected to the operation of washing and deposition alternately. Thus, the treatment of waste gas can be effected easily and continuously.

This continuous method of waste gas treatment is described with reference to FIG. 5 and FIG. 6.

Figure 6:
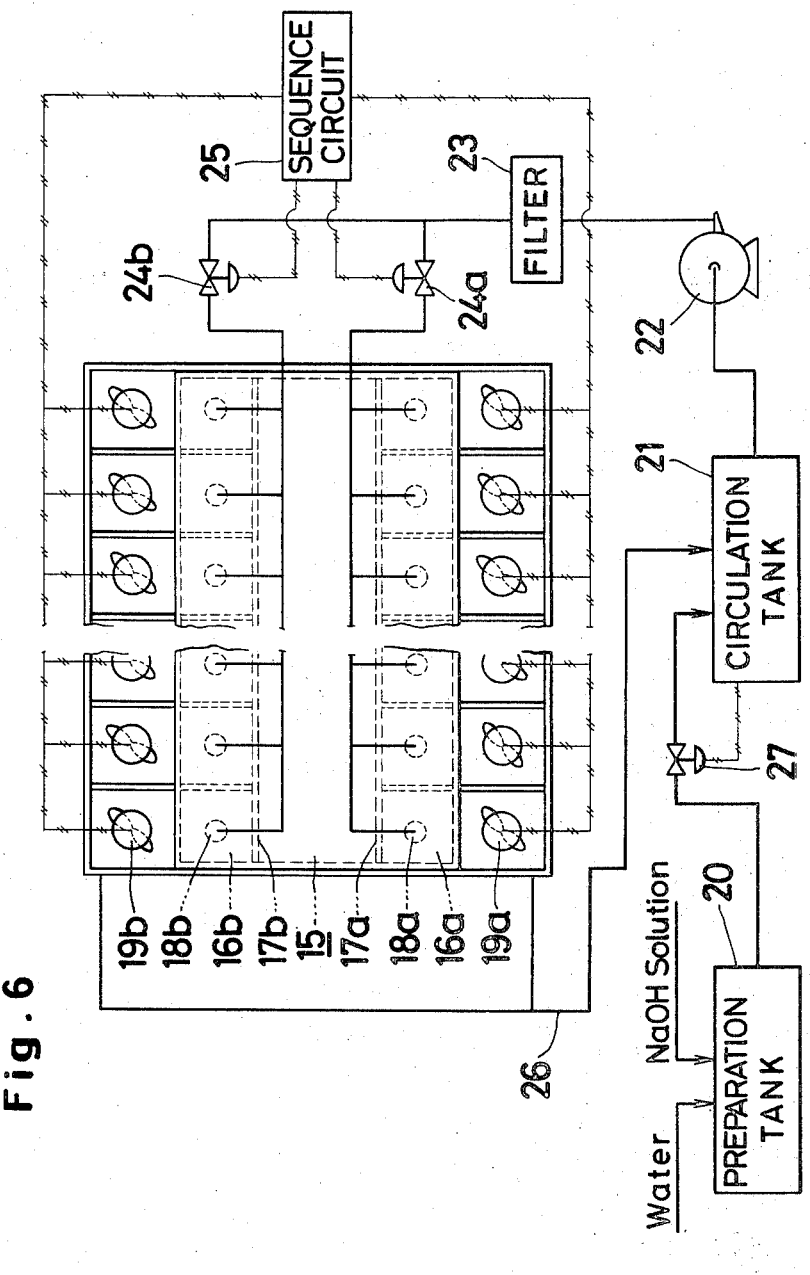
FIG. 6 is a plan view of FIG. 5.

Referring to FIG. 5, an opening 15 is formed over the ventilator on the roof of a plant operating an electrolytic cell and a plurality of vessels 17a and 17b each possessed of a packed bed 16a and 16b are disposed in two opposite rows along said opening 15 (see also FIG. 6).

A solution such as, for instance, 5 – 15% NaOH solution prepared in advance in an alkali solution preparation tank 20 is stored in an alkali solution circulation tank 21, from which the alkali solution is forwarded by means of a pump 22 to filter 23. Subsequent to removal of solid impurities by filration, solution is forwarded to control valves 24a and 24b.

The control valves 24a and 24b are operated respectively by the signal issued from the sequence circuit 25. When the valve 24a is opened, the nozzles 18a disposed in the vessels 17a spray the alkali solution onto the packed beds 16a. When the valve 24b is opened, the alkali solution is likewise sprayed onto the packed beds 16b in the vessels 17b.

While the alkali solution is being sprayed onto the packed beds, the signal for setting the fans 19a and 19b to motion are not issued by the sequence circuit 25.

The control valve 24a is opened by the starting signal from the sequence circuit 25, so that a fixed volume of alkali solution is sprayed through the nozzles 18a disposed in one group of vessels 17a onto the packed beds 16a. When the spraying of the fixed volume of alkali solution is brought to completion, the signal from the sequence circuit 25 closes the valve 25a and sets the fan 19a to motion, causing the waste gas to be led to the packed beds 16a. Thus, the fluorides present in the waste gas come into contact with the alkali and are consequently adsorbed thereby.

When a fixed volume of waste gas has been treated and the adsorbent deposited on the packed beds has its activity degraded, the signal from the sequence circuit 25 stops the fans 19a and opens the valves 24a. Thus, the alkali solution is sprayed onto the packed beds 16a to give a washing to the exhausted adsorbent deposited on the beds and, at the same time, deposits fresh alkali solution on the beds. When the regeneration of adsorbent is completed, the valves 24a are closed and the fan 19a is set to motion to resume the treatment of waste gas.

While the regeneration of adsorbent is in process in the group of vessels 17a, the fan 19b continues its operation in the other group of vessels 17b, enabling the treatment of waste gas to be carried out continuously.

The alkali solution which has washed the packed beds is collected at the bottom of the vessels and then returned back to the alkali solution circulation tank 21 through a pipe 26.

When the adsorbent depostied on the packed beds 16b in the vessels 17b has its activity degraded, it is similarly regenerated by the combined operation of rinsing and depositing.

The valve 27 serves the purpose of regulating the liquid level in the alkali solution circulation tank 21. When the alkali solution in the circulation tank 21 decreases to a fixed volume, this valve 27 is automatically opened to feed fresh alkali solution from the alkali solution preparation tank 20 to the circulation tank 21.

Thus, the waste gas can be treated continuously by installing a plurality of waste gas treating vessel in two groups, incorporating a control system, causing the impurities present in the waste gas to be adsorbed in one group of the vessels atuomatically by the signal issued from the sequence circuit and subjecting the exhausted adsorbent to the combined operation of rinsing and depositing in the other group of vessels, thereby regenerating the adsorbent alternately.

The preferred embodiment described above with reference to the drawing represents a case in which waste gas treating vessels are divided into two groups. For the convenience of operation, these vessels may be divided into three or more groups to accomplish regeneration of exhausted adsorbent alternately.

The following examples are illustrative of this invention, and it will be understood that the invention is not limited thereto.

Example 1

A vessel measuring 1 meter in height, 2 meters in width and 15 meters in length was divided longitudinally into five section in each of which there was inserted four packed beds formed in the shape of a block with 50 recticular plastic plates 1.5 meters in length and 0.5 meters in height as shown in FIG. 4. The packed beds were sprayed with 20 percent sodium carbonate solution so that a film of sodim carbonate having an average thickness of about 0.01 mm was deposited on the surface of each packed bed.

A waste gas from an aluminum manufacture plant which contained fluorides at a concentration of about 5.0 mg/m$^3$ as hydrogen fluoride was fed to this waste gas adsorbing unit at a flow rate of 1,710 Nm$^3$/min. The fluoride content of the effluent at the outlet of the packed bed was less than 1.0 mg/m$^3$.

After 20 hours of continuous treatment, the hydrogen fluoride concentration at the outlet of the packed bed began to increase. At this point, the feeding of the waste gas was switched to the other adsorbing unit. By spraying water onto the packet beds in the first unit, the sodium carbonate which had adsorbed fluorides was rinsed off the packed beds.

Then, a 20 percent aqueous solution of sodium carbonate was sprayed onto the packed beds so that the solution formed a film about 0.01 mm in thickness on the bed surface. By feeding the waste gas by the same procedure as mentioned above, fluorides were removed continuously.

Example 2

A waste gas containing hydrogen fluoride at a concentration of 5 pm was fed through the inlet into the vessel incorporating packed beds 0.3 m in length, 0.2 m in width and 1.0 meter in height in a zigzagged form as shown in FIG. 3 to purify the waste gas.

The packed bed was composed by spacing seven polyethylene nets of 3 mm mesh at intervals of 25 mm, with the nets inclined 15 degrees with reference to the vertical direction and each containing three bends at equal distances.

This packed bed was sprayed with 10 percent sodium carbonate solution injected through the nozzle, so as to deposit sodium carbonate on the surface of bed. A waste gas containing hydrogen fluoride at a concentration of about 5.0 ppm was passed through the bed at a rate of 1.8 Nm$^3$/H.

At the start of treatment, the ratio of removal of hydrogen fluoride gas was higher than 95 percent. The ratio of removal fell to 80 percent after 12 hours of continuous treatment. By way of comparative test, the same waste gas was treated by continuous spraying of water. In this treatment, the ratio of removal of hydrogen fluoride gas was in the range of about 60 percent.

Example 3

On the roof of a building in the aluminum manufacture plant, a total of 20 waste gas treating vessels each possessed of a packed bed measuring 10 meters in length, 2 meters in width and 1 meter in height were arranged in two rows of 10 vessels each.

Each packed bed was formed by arranging thin plstic plates at fixed intervals in a zigzagged pattern as shown in FIG. 3, with three bends contained in each plate.

Systems were arranged so that 18 of the 20 vessels were always operating to treat the waste gas and two of them were always engaged in the regeneration of spent adsorbent as shown in FIG. 5.

First, 10 percent sodium hydroxide solution was sprayed onto the packed beds to deposit the adsorbents on the surface of the beds. Thereafter, a waste gas (fluorine content 5 mg/m$^3$) from an electrolytic cell was introduced into the unit at a flow rate of 600 m$^3$/min per vessel.

The time for the regeneration of the adsorbent of a single packed bed was fixed at 10 minutes. When the 20 vessels were operated so that 18 of them were always operating to give treatment to the waste gas and two of them were always engaged in the regeneration of exhausted adsorbent, the ratio of removal of fluorides was 95 – 80 percent and the fluorine concentration in the outlet effluent gas was 0.5 mg/m$^3$ on the average.

Example 4

Within the adsorption tower (1.5 meters in length, 2 meters in width and 5 meters in overall height), a packed bed was formed by assembling 50 thin, plastic resin plates in the shape of a block as shown in FIG. 2. Sodium hydroxide solution was sprayed so that the solution formed deposits having an average thickness of about 0.015 mm on the surface of the said packed bed.

A waste gas emanating from a boiler using heavy oil was preparatorily cooled and washed at a flow rate of 270 Nm$^3$/min in a dust collection column. The gas discharged from this column (sulfur oxides 0.01 percent, oxygen 2-3 percent, $CO_2$ 5-10 percent, nitrogen oxides 0.005 percent, moisture 20 – 25 percent and the balance of $N_2$, temperature 20° – 25°C) was fed to the tower. The effluent at the outlet of the packed bed was found to contain sulfur oxides at a concentration of 0.0005 percent. After 20 hours of continuous treatment of the waste gas, the sulfur oxide concentration in the effluent gas rose to 0.0001 percent. so, the feeding of waste gas was switched to another adsorbing tower (identical to the aforementioned adsorption tower). The water from the rinsing water pipe was sprinkled over the packed bed to clean the bed. Thereafter, aqueous solution of sodium hydroxide was sprayed through the feed pipe to form a deposite of sodium hydroxide on the surface of packed bed. Then, the first adsorption tower was put back on operation to resume the work of adsorptive removal of sulfur oxides.

Example 5

In the apparatus used in Example 4, sodium carbonate was deposited on the surface of the packed bed by following the procedure of Example 4.

In the production of aluminum, chlorine gas is blown into the molten aluminum for the purpose of stripping hydrogen, and the waste gas from this treatment was introduced into said apparatus.

When the waste gas composed of air containing 40 mg/m$^3$ of chlorine gas was treated by this apparatus at a flow rate of 200 m$^3$/min, the hydrogen chloride content of the effluent gas was lowered to 3 mg/m$^3$.

After 8 hours of continuous treatment, the gas concentration in the effluent rose to 5 mg/m$^3$. At this point, the gas adsorbing operation was discontinued. A 10 percent sodium carbonate solution was then sprayed from the feeding pipe onto the packed bed to effect rinsing and depositing. Thereafter, the feeding of said gas was resumed to continue the removal of hydrogen chloride.

What is claimed is:

1. A method for the purification of a gas, comprising the steps of spraying an adsorbing solution selected from the group consisting of sodium carbonate solution, sodium hydroxide solution and a mixed solution thereof onto a packed bed, terminating spraying of said adsorbing solution, depositing the absorbing substance from the solution as an adsorbent on the packed bed by removing the solution solvent, said removing of solvent being by means of air passing through the packed bed, passing an impurity containing other than said air gas through said packed bed, causing impure substances present in the gas to be adsorbed by the adsorbent deposited on the packed bed and, upon degradation of the activity of the adsorbent deposited on the packed bed, removing the adsorbent from the packed bed by washing and subsequently depositing fresh adsorbent on the packed bed by again spraying said adsorbing solution.

2. The method of claim 1 wherein said removing of degraded adsorbent by washing is by spraying water prior to again spraying said adsorbing solution.

* * * * *